US010676409B1

(12) United States Patent
Iacono et al.

(10) Patent No.: US 10,676,409 B1
(45) Date of Patent: Jun. 9, 2020

(54) ENERGETIC COMPOSITES FROM METALLIZED FLUOROPOLYMER MELT-PROCESSED BLENDS

(71) Applicant: Government of the United States, as represented by the Secretary of the Air Force, Wright-Patterson AFB, OH (US)

(72) Inventors: Scott Iacono, Colorado Springs, CO (US); Jena McCollum, Colorado Springs, CO (US)

( * ) Notice: Subject to any disclaimer, the term of this patent is extended or adjusted under 35 U.S.C. 154(b) by 461 days.

(21) Appl. No.: 15/475,183

(22) Filed: Mar. 31, 2017

(51) Int. Cl.
| | | |
|---|---|---|
| *C06B 27/00* | (2006.01) | |
| *C06B 21/00* | (2006.01) | |
| *B29C 67/00* | (2017.01) | |
| *B29C 45/00* | (2006.01) | |
| *B33Y 70/00* | (2020.01) | |
| *C06B 23/00* | (2006.01) | |
| *D03D 23/00* | (2006.01) | |
| *D03D 43/00* | (2006.01) | |
| *B29K 27/00* | (2006.01) | |
| *B29K 67/00* | (2006.01) | |
| *B29K 105/16* | (2006.01) | |

(Continued)

(52) U.S. Cl.
CPC ...... *C06B 21/0025* (2013.01); *B29C 45/0001* (2013.01); *B29C 67/0055* (2013.01); *B33Y 70/00* (2014.12); *C06B 23/00* (2013.01); *B29K 2027/16* (2013.01); *B29K 2067/046* (2013.01); *B29K 2105/16* (2013.01); *B29K 2505/02* (2013.01); *B29K 2507/02* (2013.01)

(58) Field of Classification Search
USPC ........ 149/22, 87, 108.2, 109.2, 109.4, 109.6
See application file for complete search history.

(56) References Cited

U.S. PATENT DOCUMENTS

| 5,387,380 A | 2/1995 | Cima |
| 6,143,378 A | 11/2000 | Harwell |
| 7,608,478 B2 | 10/2009 | Gangopadhyay |

(Continued)

FOREIGN PATENT DOCUMENTS

| WO | WO 2011114089 | 9/2011 |
| WO | WO 2015054411 | 4/2015 |

(Continued)

OTHER PUBLICATIONS

Arranz-Andres, Lightweight nanocomposites based on poly(vinylidene fluoride) and Al nanoparticles, Materials Chemistry and Physics 142, 2013, pp. 469-478.
Connor, Comparing Boron and Aluminum Nanoparticle Combustion in Teflon Using Ultrafast Emission Spectroscopy, J. Phys. Chem., C 2012, 116, 2751-2760.

(Continued)

*Primary Examiner* — James E McDonough
(74) *Attorney, Agent, or Firm* — Timothy M. Barlow; AFMCLO/JAZ

(57) ABSTRACT

An energetic composite comprises a metal powder; poly(vinylidene fluoride) (PVDF); and poly(lactic acid) (PLA). The metal powder comprises micrometer- or nanometer-sized particles, and the ratio of PVDF to PLA is between about 1:3 to 3:1. The metal powder comprises between about 4-32% wt of the energetic composite, and the metal powder consists of aluminum (Al), magnesium (Mg), or boron (B). A method of making an energetic composite material, comprises melt-blending a metal powder with poly(vinylidene fluoride) (PVDF) and poly(lactic acid) (PLA).

20 Claims, 3 Drawing Sheets

(51) Int. Cl.
 *B29K 505/02* (2006.01)
 *B29K 507/02* (2006.01)

(56) References Cited

U.S. PATENT DOCUMENTS

| | | | |
|---|---|---|---|
| 7,834,295 B2 | 11/2010 | Sharma | |
| 2008/0093418 A1 | 4/2008 | Weihs | |
| 2010/0291304 A1 | 11/2010 | Becker | |
| 2013/0005878 A1* | 1/2013 | Hsu | C08K 5/3415 524/104 |
| 2013/0180450 A1 | 7/2013 | Hamilton | |
| 2014/0109551 A1 | 4/2014 | Tappan | |
| 2014/0227548 A1 | 8/2014 | Myrick | |
| 2014/0335409 A1 | 11/2014 | Wang | |
| 2016/0169639 A1 | 6/2016 | Smart | |

FOREIGN PATENT DOCUMENTS

| | | |
|---|---|---|
| WO | WO 2015124250 | 8/2015 |
| WO | WO 2016064489 | 4/2016 |

OTHER PUBLICATIONS

Delisio, Ignition and Reaction Analysis of High Loading Nano-Al/Fluoropolymer Energetic Composite Films, AIAA SciTech 2014.

Delisio, Probing the Reaction Mechanism of Aluminum/Polyvinylidene Fluoride Composites, J. Phys. Chem. B 2016.

Dudek, FDM 3D Printing Technology in Manufacturing Composite Elements, Archives of Metallurgy and Materials, 2013, vol. 58, Issue 4.

Hamad, Melt Rheology of Poly(Lactic Acid)/Low Density Polyethylene Polymer Blends, Adv. Chem. Eng. Sci., 2011, 1, 208-214.

Chuan Huang, Electrospray Deposition of Energetic Polymer Nanacomposites with High Mass Particle Loadings: A Prelude to 3D Printing of Rocket Motors, Adv. Eng. Mater., 2015.

Hwang, Thermo-mechanical Characterization of Metal/Polymer Composite Filaments and Printing Parameter Study for FDM in the 3D Printing Process, J. Elec. Mater. 2015, vol. 44.

Kaseem, Melt Rheology of Poly(vinylidene fluoride) (PVDF)/Low Density Polyethylene (LDPE) Blends, Polymer Science A, 2015, vol. 57, No. 2, 233-238.

\* cited by examiner

ENERGETIC COMPOSITES FROM METALLIZED FLUOROPOLYMER MELT-PROCESSED BLENDS

RIGHTS OF THE GOVERNMENT

The invention described herein may be manufactured and used by or for the Government of the United States for all governmental purposes without the payment of any royalty.

FIELD OF THE INVENTION

The present invention relates generally to energetic composites and, more particularly, to energetic composites from metallized fluoropolymer melt-processed blends.

BACKGROUND OF THE INVENTION

Two methods that are of high value for polymer composites are injection molding and 3D printing by fused deposition modeling (FDM). In these instances, a thermoplastic matrix is used like a carrier fluid to house a variety of additives to produce multi-functional materials. However, no known techniques exist for manufacturing items from energetic composites and those composites having a high metal or particle loading via injection molding and 3D printing. Currently, PVDF is processed by other methods e.g. compression molding and electrospraying. Accordingly, it would be desirable to be able to perform FDM printing of fluorinated-metallized polymer composites.

SUMMARY OF THE INVENTION

The present invention overcomes the foregoing problems and other shortcomings, drawbacks, and challenges of energetic compounds suitable for manufacturing parts by extrusion-based techniques, i.e. FDM (fused deposition modeling), 3D printing, and injection molding. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, an energetic composite comprises a metal powder; poly(vinylidene fluoride) (PVDF); and poly(lactic acid) (PLA). Advantageously, this energetic composite material is able to be fabricated into complex geometries with micron-scale resolution while avoiding the use of solvents. The metal powder may comprise metal or metalloid components, e.g., aluminum, boron, and/or magnesium, and for purposes of this disclosure shall be referred to herein as metal or metal powder.

According to another embodiment of the invention, the metal powder comprises nanometer-sized particles. The inclusion of nanometer-sized particles is advantageous because the small size of the metal particles allows the density of the metal particles, which are the fuel for the energetic composite, to be optimized according to the desired flame propagation rate or other performance characteristics.

According to a further embodiment of the invention, the metal powder comprises micrometer-sized particles. The inclusion of micrometer-sized particles is advantageous because the small size of the metal particles allows the density of the metal particles, which are the fuel for the energetic composite, to be optimized according to the desired flame propagation rate or other performance characteristics.

According to another embodiment of the invention, PVDF comprises between about 17-75% of the energetic composite. The inclusion of PVDF is advantageous because PVDF provides mechanical strength and corrosion resistance qualities, which are able to be 'tuned' according to the desired performance characteristics of the energetic composite.

According to a further embodiment of the invention, the PVDF:PLA ratio is between about 3:1 to 1:3. This corresponds to between about 75% PVDF:25% PLA to 25% PVDF:75% PLA. The inclusion of PVDF is advantageous because PVDF provides mechanical strength and corrosion resistance qualities, and PLA lowers the processing temperatures such that adjustment of the PVDF:PLA ratio permits the material properties of the energetic composite to be 'tuned' according to the desired performance characteristics of the energetic composite.

According to another embodiment of the invention, the metal powder comprises between about 4-32% wt of the energetic composite. The ability to include a metal fuel particles in a broad range is advantageous because the adjustable metal particle concentration within the energetic composite allows the density of the metal particles to be to be optimized according to the desired flame propagation rate or other performance characteristics.

According to a further embodiment of the invention, the metal powder consists of aluminum (Al), magnesium (Mg), or boron (B). These metals serve as metal fuels which are in some way oxidized in an exothermic fashion. Advantageously, these three metal fuels have the highest specific energy output compared to other metals, and they are able to be made commercially in micrometer- and nanometer-sized particles.

According to another embodiment of the invention, a method of making an energetic composite material comprises melt-blending a metal powder with poly(vinylidene fluoride) (PVDF) and poly(lactic acid) (PLA). Advantageously, this method provides an avenue to fabricate complex geometries with micron-scale resolution while avoiding the use of solvents. It is noted that PVDF and PLA are not miscible in one another as observed by high resolution microscope, but 'by appearance' they are not separately identifiable. However, phase domains may be visible.

According to a further embodiment of the invention, the method of making an energetic composite material further comprises performing the melt-blending between about 180-200° C. Advantageously, this temperature range permits the energetic composite material to be blended thoroughly without igniting the composite.

According to another embodiment of the invention, the method of making an energetic composite material further comprises performing the melt-blending between about 180-190° C. Advantageously, this temperature range permits the energetic composite material to be blended thoroughly without igniting the composite.

According to a further embodiment of the invention, the method of making an energetic composite material further comprises performing the melt-blending at about 185° C. Advantageously, this temperature range permits the energetic composite material to be blended thoroughly without igniting the composite.

According to another embodiment of the invention, the metal powder comprises nanometer-sized particles. The inclusion of nanometer-sized particles is advantageous because the small size of the metal particles allows the density of the metal particles, which are the fuel for the energetic composite, to be optimized according to the desired flame propagation rate or other performance characteristics.

According to a further embodiment of the invention, the PVDF:PLA ratio is between about 3:1 to 1:3. The inclusion of PVDF is advantageous because PVDF provides mechanical strength and corrosion resistance qualities, and PLA lowers the processing temperatures such that adjustment of the PVDF:PLA ratio permits the material properties of the energetic composite to be 'tuned' according to the desired performance characteristics of the energetic composite.

According to another embodiment of the invention, the metal powder comprises between about 4-32% wt of the energetic composite. The ability to include a metal fuel particles in a broad range is advantageous because the adjustable metal particle concentration within the energetic composite allows the density of the metal particles to be to be optimized according to the desired flame propagation rate or other performance characteristics.

According to a further embodiment of the invention, the metal powder consists of aluminum (Al), magnesium (Mg), or boron (B). These metals serve as metal fuels which are in some way oxidized in an exothermic fashion. Advantageously, these three metal fuels have the highest specific energy output compared to other metals, and they are able to be made commercially in micrometer- and nanometer-sized particles.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

New energetic composites have been prepared by melt processing PVDF and PLA with metal/metalloid powders. The composite rheology is manipulated by melt blending PVDF (poly(vinylidene fluoride)) with PLA (poly(lactic acid)). The composite rheology also makes it possible, for the first time, to manufacture parts from an energetic composite material by extrusion-based techniques. Currently, processing of PVDF may be accomplished by other methods, e.g. compression molding and electrospraying. Prior to the development of the disclosed method, it was not known how to make an energetic composite filament, e.g. containing PVDF and nanometer-sized metal particles, for use in 3D printing by FDM or for other uses. The disclosed approach enables FDM printing of fluorinated-metallized polymer composites, using PLA to lower viscosity and assist in layer-to-layer adhesion.

It was discovered that the polymer blend of PVDF and PLA lowers the melt-processing temperature of the composite such that FDM and injection molding may be achieved. This energetic combination of PVDF, PLA, and metal particles is able to be formed by injection-molding and FDM to form energetic composites that are able to achieve ignition and steady flame propagation. This invention represents the first time melt-processing of these polymers had been achieved for energetic applications.

Figure 1:
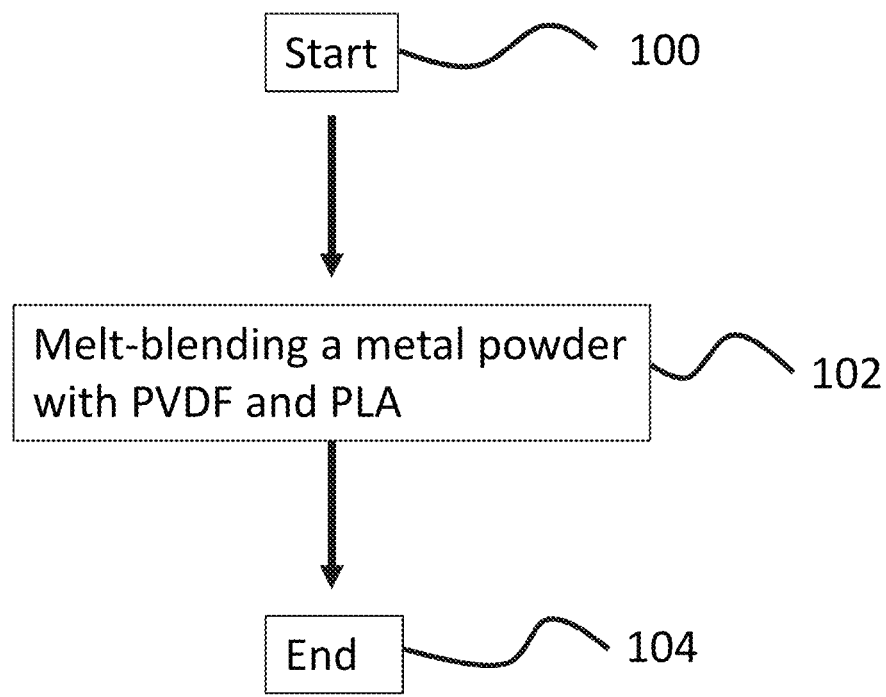
FIG. 1 depicts a method of making an energetic composite material, according to an embodiment of the invention.
Figure 2:
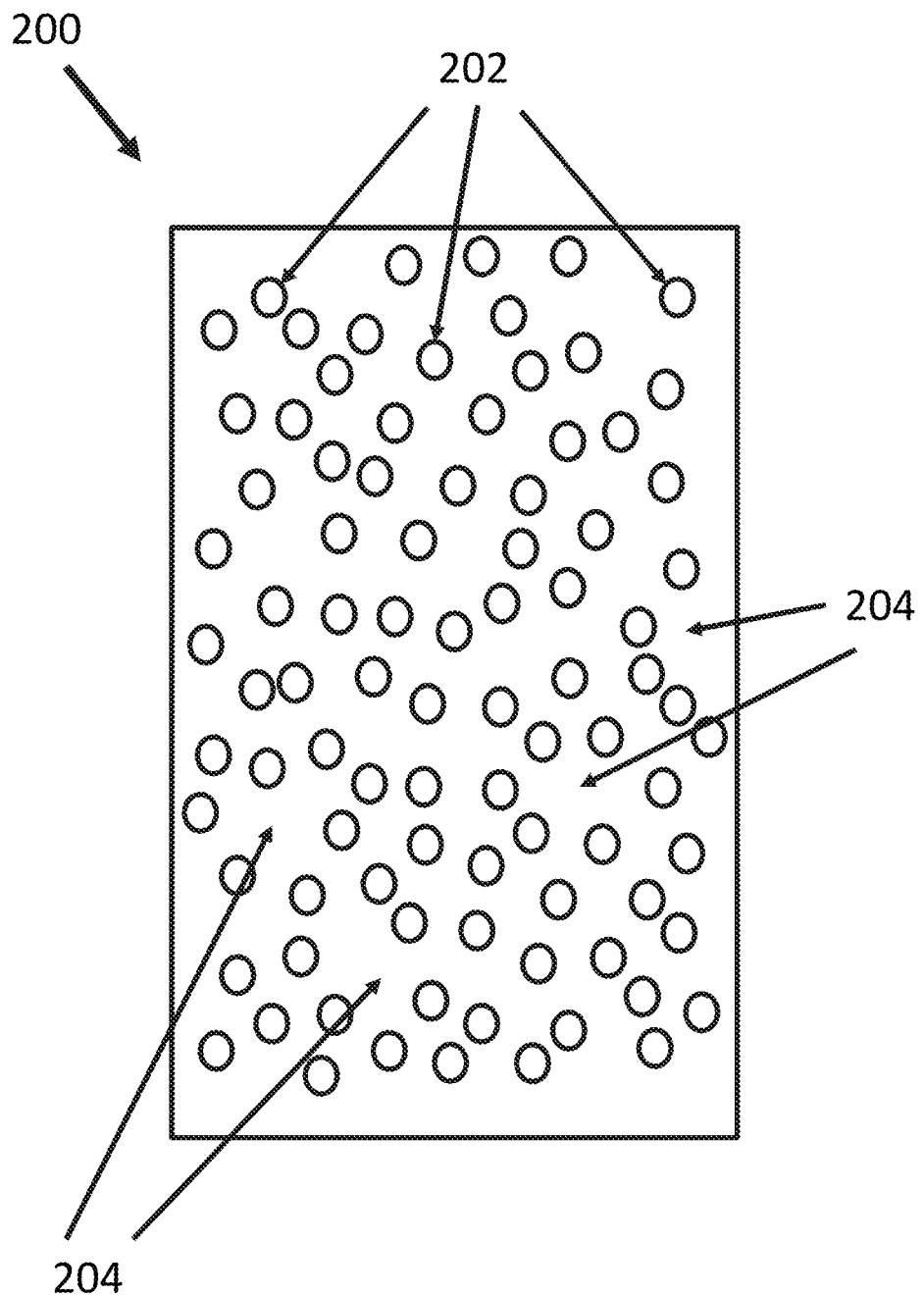
FIG. 2 depicts a sectional view of an energetic composite material, according to an embodiment of the invention.

According to one embodiment of the present invention, an energetic composite comprises a metal powder; poly(vinylidene fluoride) (PVDF); and poly(lactic acid) (PLA). Advantageously, this energetic composite material is able to be fabricated into complex geometries with micron-scale resolution while avoiding the use of solvents. As depicted in FIG. 1, the method of making an energetic composite comprises melt-blending a metal powder with poly(vinylidene fluoride) (PVDF) and poly(lactic acid) (PLA). The method starts (step 100) by melt-blending a metal powder with PVDF and PLA (step 102), which ends the method (step 104). FIG. 2 illustrates a sectional view of an energetic composite material 200 according to an embodiment of the invention, which includes a plurality of metal powder particles 202 in a blend of PVDF and PLA 204. The metal powder particles 202 are depicted as spherical or nearly so, but may include any particular shape that generally corresponds to the specified size range, e.g. nanometer-sized particles or micrometer-sized particles. The PVDF and PLA are melt-blended together to for a generally homogeneous mixture that, when cooled, traps the metal powder particles 202 in the composite material 200. Advantageously, this method provides an avenue to fabricate complex geometries with micron-scale resolution while avoiding the use of solvents. It is noted that PVDF and PLA are not miscible in one another as observed by high resolution microscope, but 'by appearance' they are not separately identifiable. However, phase domains may be visible.

Figure 3:
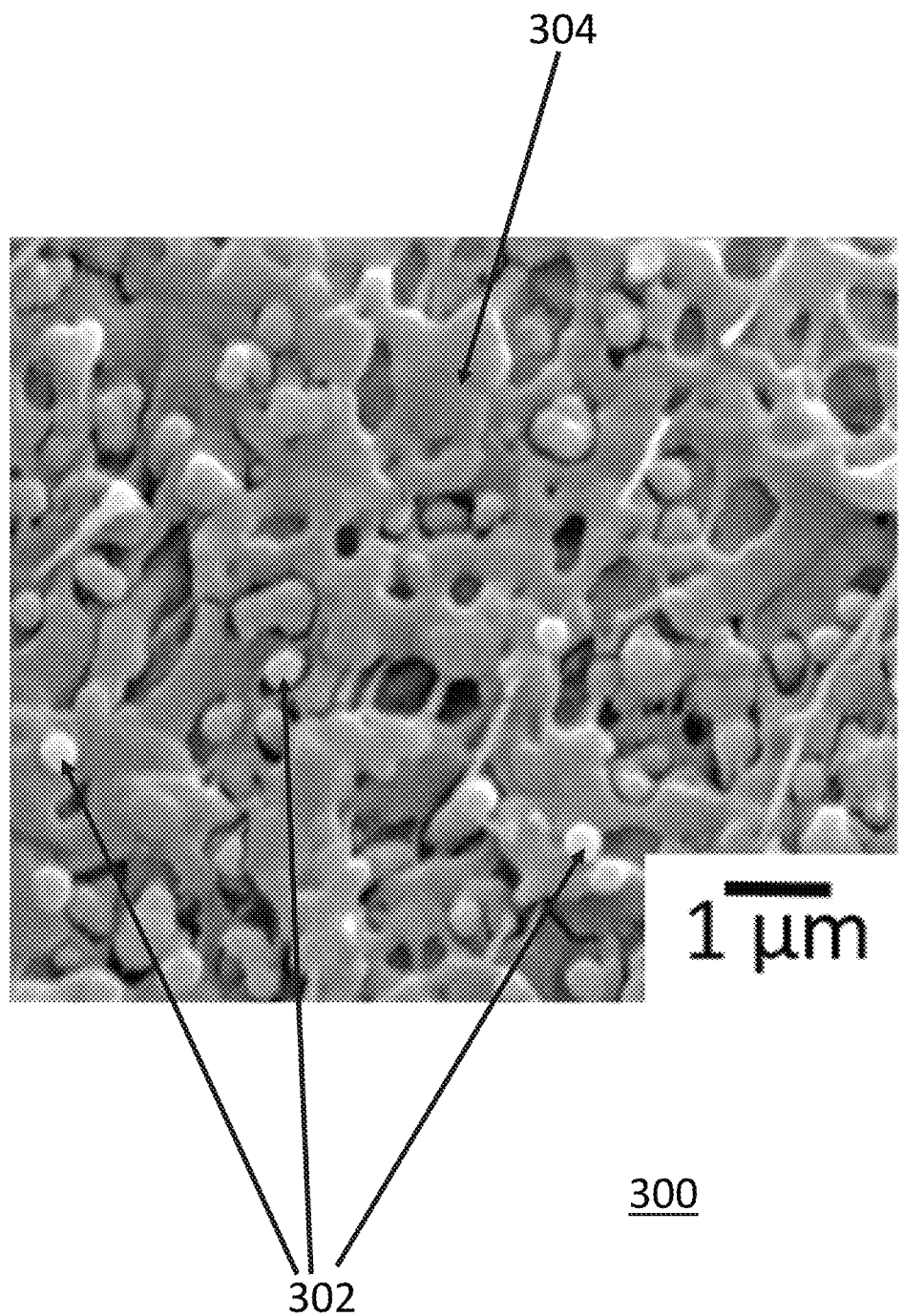

FIG. 3 depicts a homogenous distribution 300 of PLA in PVDF 304. As the microscope image illustrates, the diameter of the PLA phase domains 302 may be 300-500 nm. The well-dispersed, nano-scale phase domains of PLA 302 means that the disclosed processing technique produces homogenous materials. In addition, the method presents an opportunity to fine-tune nanoparticle (i.e., Al, Mg, B, etc.) dispersion because the PLA 302 is so well dispersed in small domains in the insoluble polymer (i.e., PVDF 304).

As explained above, the metal powder 202 may comprise nanometer-sized particles or micrometer-sized particles. The inclusion of nanometer-sized particles and/or micrometer-sized particles is advantageous because the small size of the metal powder particles 202 allows the density of the metal particles, which are the fuel for the energetic composite 200, to be optimized according to the desired flame propagation rate or other performance characteristics of the composite material 200.

According to one embodiment of the invention, PVDF comprises between about 25-75% of the energetic composite 200. Higher or lower amounts of PVDF may be included depending on the desired performance characteristics of the composite material 200. The PVDF:PLA ratio may be between about 3:1 to 1:3. The inclusion of PVDF is advantageous because PVDF provides mechanical strength and corrosion resistance qualities, which are able to be 'tuned' according to the desired performance characteristics of the energetic composite. A broad range of ratios of metal powder:PVDF:PLA, e.g., may be selected according to the desired performance characteristics of the composite material 200.

The metal powder, e.g., aluminum (Al), magnesium (Mg), and/or boron (B), may comprise between about 4-32% wt of the energetic composite. The ability to include metal fuel particles 202 in a broad range is advantageous because the adjustable metal particle concentration within the energetic composite 200 allows the density of the metal particles to be to be optimized according to the desired flame propagation rate or other performance characteristics.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Two methods that are of high value for polymer composites are injection molding and 3D printing by fused deposition modeling (FDM). In these instances, a thermoplastic matrix may be used like a carrier fluid to house a variety of additives, e.g. metal or metalloid particles, to produce multifunctional materials. The disclosed methods may be performed in order to infuse metal particles in a polymer matrix. When these techniques are applied to energetic materials, the polymer matrix may encase the metal particles, greatly improving handling and safety, reducing aging effects, reducing oxygen diffusion, and controlling composite geometry for sensitive applications.

One subset of energetic materials includes thermites which may comprise a metal/metalloid fuel (i.e., boron (B), aluminum (Al) or magnesium (Mg)) and oxidizing source (i.e., metal oxides, air or fluoropolymers). For purposes of clarity, metals and metalloids are referred to herein simply as 'metals'. Generally, aluminum particles are naturally passivated with a 3-5 nm thick metal-oxide layer. This passivation layer limits further oxygen diffusion which improves micrometer- and nanometer-scale powder handling under ambient conditions and reduces the risk of unintentional ignition. The reactant is the metal powder. When metal powders are exposed to moisture or oxygen rich environments (i.e., ambient laboratory conditions), diffusion will occur on a slow time scale which may result in a gradual increase of this oxide layer thickness. The excess oxide layer is not desirable because it reduces the amount of metal available as a fuel. The ignition reaction occurs in spite of this oxide layer because the reactant is the metal, but it may be hindered by the oxide layer. Increasing the oxide layer thickness effectively decreases fuel content. The hydrophobic properties of PVDF make it an excellent moisture barrier for the encased metal particles, which greatly slows the aging process. Accordingly, shelf life of the energetic compounds may be increased, and performance of the composite material may be improved, including in high humidity environments.

Advantageously, the PVDF component also acts as an oxidizing source. While a traditional thermite is highly energy dense, the formation enthalpy of metal-oxygen bonds is lower than that of metal-fluorine bonds. In some cases, using a fluorinated oxidizer results in higher reaction rates and larger reaction enthalpies. For example, the aluminum oxide ($Al_2O_3$) formation reaction is summarized in Eq. (1), $$2Al + 3MO \rightarrow Al_2O_3 + 3M + \Delta H \quad (1)$$

where Al is the fuel, MO represents a metal oxide which reduces to a metal (M) and $\Delta H$ is the heat released from the reaction. When fluorine is used as an oxidizing source (i.e., PTFE, PFPE, PVDF), the resulting product is aluminum trifluoride ($AlF_3$). A simplified reaction between Al and PTFE (—$CF_2$—) is summarized in Eq. (2), $$2Al + 3(\sim CF_2 \sim) \rightarrow 2AlF_3 + 3C + \Delta H \quad (2)$$

where Al is the fuel, $CF_2$ represents one unit of PTFE and $\Delta H$ is the heat released from the reaction. Fluorinated materials improve energetic performance because (1) $AlF_3$ liberates more energy than $Al_2O_3$ (−56.10 kJ/g for $AlF_3$ versus −30.98 kJ/g for $Al_2O_3$) and (2) $AlF_3$ sublimes at a much lower temperature than $Al_2O_3$ (1276° C. for $AlF_3$ and 3000-3700° C. for $Al_2O_3$) which creates less thermal resistance during the reaction. In equation (2) above, C represents the carbon from the PTFE backbone. Equation (2) is effectively representing that all of the available fluorine in the polymer, e.g. PVDF, transfers to Al to form $AlF_3$, leaving carbon.

We have discovered that a fluorinated thermoplastic, i.e., PVDF, may be melt-compounded with Al powder and used to produce injection-molded energetic coupons. In one example, these composites comprised nanometer-sized Al with PVDF. During processing, PVDF crystallinity increased significantly from 45.3 to 74.0% as Al particle loading increased from 0 to 8 wt %. This crystallinity created a loading limit, which created further limitations in composite stoichiometry from an energetic point of view. In addition, thermal decomposition was enhanced with Al concentration and the Al:PVDF composite experienced a 36° C. decrease in decomposition onset with only 0.5 wt % loading. That is, the presence of Al accelerates the decomposition of PVDF. As an example, if a composite with 99.5% PVDF/0.5% Al is heated, the PVDF starts to decompose 36° C. sooner than a PVDF sample having no Al. Energetically, coupons made with greater than 4 wt % Al experienced thermal ignition, but did not self-propagate until Al concentration was increased to 6 wt %.

While the goal of injection molding an energetic coupon was achieved, it is important to increase Al loading in these coupons in order to study fuel-rich composite formulations. Additionally, filaments of these composites were unable to print without raising the print temperature within a range that would decompose the PVDF matrix and risk unintentional ignition.

In another example, the fuel of interest is boron (B). The expected general reaction is explained in Eq. (2) above. For injection molded composites of nano-scale Al and PVDF (≥6 wt % Al), the primary reaction product is $AlF_3$ (confirmed by XRD). The reaction path for B and PVDF mimics the Al reaction, such that the primary product is boron trifluoride ($BF_3$). Aluminum fluoride is a solid at ambient temperature, but $BF_3$ is a gas. Because of this, B may be a more suitable fuel because most of the products for this reaction would be gaseous. However, from a processing standpoint, challenges remain that the polymers need to interface with a metal oxide surface in a way that they still maintain good melt flow and adhesion properties.

To resolve these issues, PVDF was melt-processed with PLA. It was found that PLA serves the system by lowering the processing temperature of the composite material, while PVDF provides better mechanical properties and corrosion resistance.

Compounding

Prior to processing, the 100 g of PLA was dried in a vacuum oven at 50° C. for 4 hours. The polymers were weighed dry to a constant total volume of 7 cm³ ($V_{PVDF}+V_{PLA}=V_{total}$) and fed into a HAAKE Minilab II (Thermo Scientific, Waltham, Mass.) twin screw compounder. Mass percent varied by 25% from 0 to 100% for a total of 5 mixtures (see Table 1). Each mixture was compounded at 185° C. and 250 rpm for 5 min while monitoring apparent viscosity.

Injection Molding

The molten mixture was then fed into a preheated cylinder (205° C.) and a HAAKE Minijet Pro (Thermo Scientific, Waltham, Mass.) was used to form the rectangular bars via injection molding. The cylinder was placed on top of a heated mold (93° C.) and fitted with a plunger. The plunger was pushed by a hydraulic press in order to push the molten composite into the mold. The press was programmed to deliver a pressure of 650 bar for 15 seconds, and then the pressure was reduced to 300 bar for 10 seconds before releasing. The mold was then removed from the machine and opened to reveal the injected coupon.

Fused Deposition Modeling

A bar, dog bone and disc were printed by FDM to match the dimensions of the molds used for injection molded samples. The printer (Ultimaker 2) was programmed with a nozzle temperature of 210° C., print bed of 60° C. and an average filament diameter of 2.5 mm.

Process Monitoring

During compounding, changes in pressure across the channel of the samples were monitored via two pressure transducers in the channel of the compounder. Using, Eq (3), apparent viscosity may be determined where η is the apparent viscosity, w and h are the width (10 mm) and depth (1.5 mm) of the Minilab II flow channel, ΔL is the distance between pressure transducers (64 mm), ΔP is the measured pressure difference between transducers and n is the screw speed (rpm) and $8 \cdot 10^{-7}$ is a correlation factor determined with polyolefin.

$$\eta = \left(\frac{w \cdot h^3}{12 \cdot \Delta L}\right) \cdot \frac{\Delta P}{8 \cdot 10^{-7} \cdot n} \quad (3)$$

Measured values for ΔP and calculated values are presented in Table 1. All samples where PLA was present showed a steady ΔP decline with increasing PLA concentration. For PVDF alone, this value varied significantly (±10 MPa) for each point in time. The values shown for the PVDF only samples are calculated as an average of these points. The uncertainty values are calculated for all samples as the change in ΔP from t=0 to t=5 minutes. (Note: In order to achieve stable ΔP values for PVDF, compounding time was extended to 20 min at which the ΔP values were still unstable.)

TABLE 1

Pressure measurements and viscosity calculations during compounding for each sample.

| Sample Designation | Sample PLA/PVDF (wt%) | ΔP (MPa) | η (Pa · s) |
|---|---|---|---|
| 1 | 100/0 | 3.75 | 8240 |
| 2 | 75/25 | 4.55 | 9998 |
| 3 | 50/50 | 4.85 | 10657 |
| 4 | 25/75 | 5.56 | 12415 |
| 5 | 0/100 | 8.75 | 19226 |

Because the melt viscosity of PLA is much lower than that of PVDF, the viscosity increase is expected. Compounding parameters for printed and injection molded parts are the same, so this data is representative of the viscosities observed in both sample types.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An energetic composite comprising:
a metal powder;
poly(vinylidene fluoride) (PVDF); and
poly(lactic acid) (PLA).

2. The energetic composite of claim 1, wherein the metal powder comprises nanometer-sized particles.

3. The energetic composite of claim 1, wherein the ratio of PVDF to PLA is between about 1:3 to 3:1.

4. The energetic composite of claim 1, wherein the metal powder comprises between about 4-32% wt of the energetic composite.

5. The energetic composite of claim 1, wherein the metal powder consists of aluminum (Al), magnesium (Mg), or boron (B).

6. A method of making an energetic composite material, comprising:
melt-blending a metal powder with poly(vinylidene fluoride) (PVDF) and poly(lactic acid) (PLA).

7. The method of making an energetic composite material of claim 6, further comprising performing the melt-blending between about 180-200° C.

8. The method of making an energetic composite material of claim 6, further comprising performing the melt-blending at about 185° C.

9. The method of making an energetic composite material of claim 6, wherein the metal powder comprises nanometer-sized particles.

10. The method of making an energetic composite material of claim 6, wherein the ratio of PVDF to PLA is between about 1:3 to 3:1.

11. The method of making an energetic composite material of claim 6, wherein the metal powder comprises between about 4-32% wt of the energetic composite.

12. The method of making an energetic composite material of claim 6,
wherein the metal powder consists of aluminum (Al), magnesium (Mg), or boron (B).

13. An energetic composite consisting of:
a metal powder;
poly(vinylidene fluoride) (PVDF); and
poly(lactic acid) (PLA).

14. A method of making an energetic composite material, consisting of:
melt-blending a metal powder with poly(vinylidene fluoride) (PVDF) and poly(lactic acid) (PLA).

15. The energetic composite of claim 1,
wherein the amount of PVDF by weight in the composite is less than the amount of PLA.

16. The energetic composite of claim 1,
wherein the amount of PLA by weight in the composite is less than the amount of PVDF.

17. The energetic composite of claim 1,
wherein the amount of PVDF by volume in the composite is less than the amount of PLA.

18. The energetic composite of claim 1,
wherein the amount of PLA by volume in the composite is less than the amount of PVDF.

19. The energetic composite of claim 13,
wherein the ratio of PVDF to PLA is between about 1:3 to 3:1.

20. The energetic composite of claim 1,
wherein the metal powder consists of nanometer-size particles of aluminum (Al), magnesium (Mg), or boron (B).

* * * * *